US012253880B1

(12) United States Patent
Yu

(10) Patent No.: US 12,253,880 B1
(45) Date of Patent: Mar. 18, 2025

(54) EXTENDED DISPLAY SCREEN

(71) Applicant: Liling Yu, Xinyi (CN)

(72) Inventor: Liling Yu, Xinyi (CN)

( * ) Notice: Subject to any disclaimer, the term of this patent is extended or adjusted under 35 U.S.C. 154(b) by 0 days.

(21) Appl. No.: 18/588,608

(22) Filed: Feb. 27, 2024

(30) Foreign Application Priority Data

Feb. 2, 2024 (CN) .......................... 202420270762.2

(51) Int. Cl.
*G06F 3/0481* (2022.01)
*G06F 1/16* (2006.01)
*G06F 1/18* (2006.01)
*G06F 3/01* (2006.01)
*G06F 3/0354* (2013.01)

(52) U.S. Cl.
CPC .......... *G06F 1/1615* (2013.01); *G06F 1/1641* (2013.01); *G06F 1/183* (2013.01)

(58) Field of Classification Search
CPC ........ H01H 9/08; H01H 9/085; G06F 1/1615; G06F 1/1641; G06F 1/183
See application file for complete search history.

(56) References Cited

U.S. PATENT DOCUMENTS

| 4,072,840 | A | * | 2/1978 | Daigle | ..................... | H01H 9/08 248/27.1 |
| 2016/0118205 | A1 | * | 4/2016 | Li | ......................... | G06F 3/0202 200/5 A |
| 2020/0233536 | A1 | * | 7/2020 | Hong | .................... | G06F 1/1641 |
| 2022/0377920 | A1 | * | 11/2022 | Zheng | .................. | G06F 1/1681 |

* cited by examiner

*Primary Examiner* — Deeprose Subedi

(57) ABSTRACT

An extended display screen includes a display body, a key device. The key device is connected to the display body, and the key device is electrically connected to the display body. By integrating the display body and the key device together, an integrated design of a display device and a keyboard device is achieved, making the device more compact, easy to carry, and simplifying an assembly and use process of the device. At the same time, due to the integrated design, the extended display screen doesn't need to use an external bracket, reducing occupation of desktop space, making the user's working area cleaner and more compact.

17 Claims, 14 Drawing Sheets

EXTENDED DISPLAY SCREEN

CROSS-REFERENCE TO RELATED APPLICATIONS

The application claims priority of Chinese patent application CN2024202707622, filed on Feb. 2, 2024, which is incorporated herein by reference in its entireties.

TECHNICAL FIELD

The present invention relates to a field of extended display screens, in particular to an extended display screen.

BACKGROUND ART

An existing split screen display on a market needs to be set up on a desktop through a bracket during use, which results in a large amount of desktop space being occupied. At the same time, users need to operate various tools such as a keyboard and a mouse, and the desktop can easily appear very messy due to these tools. This messy arrangement not only affects an overall aesthetic of a working environment, but may also have a negative impact on working efficiency. Secondly, a traditional split screen display is usually set on a left side or a right side of a main display, and users need to constantly turn their heads left and right when viewing content on a split screen. This not only increases neck and eye fatigue, but may also affect users' focus on the content on the split screen. In addition, interweaving of the keyboard, the display, and power wires not only brings visual chaos to the desktop, but also lets users fall into a tangle of wires, making it inconvenient for daily use.

SUMMARY

In order to overcome shortcomings of existing technology, an extended display screen is provided in the present invention, including a display body and a key device. The key device is connected to the display body, and the key device is electrically connected to display body.

As an improvement of the present invention, the display body includes a left side, a right side, an upper side, and a lower side. A distance from the left side to the right side is a first distance, and the first distance is 28 cm-39 cm. A distance from the upper side to the lower side is a second distance, and a length of the second distance is 7 cm-16 cm.

As an improvement of the present invention, the lower side of the display body is rotatably connected to the key device, so that the upper side of the display body is brought close to a lower end of a main display device via rotation. The display body is capable of rotating to a position where a display surface of the display body abuts against a front surface of the key device.

As an improvement of the present invention, the extended display screen further includes a connector. The display body includes a first end. The key device includes a second end. The connector includes a third end and a fourth end, and the fourth end is opposite to the third end. The third end of the connector is rotatably connected to the first end of the display body, and the fourth end of the connector is connected to the second end of the key device.

As an improvement of the present invention, the extended display screen further includes a rotating device. The rotating device includes a first rotating member, a second rotating member, and a shaft. The first rotating member and the second rotating member are sleeved on the shaft, so that the first rotating member is rotatable relative to the second rotating member. The first rotating member is connected to the first end of the display body, and the second rotating member is connected to an end surface of the third end of the connector, so that the display body is rotatably connected to the connector.

As an improvement of the present invention, the second rotating member further includes a gasket, and the third end of the connector further includes an end surface. The gasket is installed on the end surface of the third end of the connector, and the second rotating member is connected above the end surface, so that the first rotating member together with the end surface of the third end of the connector forms a first gap.

As an improvement of the present invention, the extended display screen further includes a wire. The second end of the key device is provided with a first wiring through hole. The first end of the display body is provided with a second wiring through hole, and the connector is provided with a through wiring channel. A lower end of the wiring channel is in communication with the first wiring through hole, and an upper end of the wiring channel is in communication with the second wiring through hole. One end of the wire is connected to the key device, and an other end of the wire passes through the first wiring through hole, the wiring channel and the second wiring through hole in sequence and is electrically connected to the display body.

As an improvement of the present invention, the key device includes an installation seat and a plurality of separate keys. The plurality of separate keys are detachably inserted onto the installation seat.

As an improvement of the present invention, the keys include a plurality of first keys. The first keys include a first key cap and a first shaft body. A bottom of the first shaft body is detachably inserted on the installation seat, and a cross shaped slot is provided at a center of a bottom of the first key cap. A top of the first shaft body is provided with a raised cross shaped shaft center, and the slot is detachably connected to the shaft center to make the first shaft body detachably connected to the first key cap.

As an improvement of the present invention, the key device further includes a base, and the installation seat is installed on the base. The installation seat includes a PCB board and a positioning board. The PCB board is equipped with an installation part for correspondingly installing the keys. The positioning board is equipped with a plurality of positioning holes, and a position of the positioning holes corresponds one by one to a position of the installation part. The installation part includes a first installation part. The first keys pass through the positioning holes and are detachably installed on the first installation part of the PCB board.

As an improvement of the present invention, the first shaft body is equipped with a first positioning column and first pins. The first installation part includes a first positioning slot and first hot plug sockets. When the first positioning column is installed in the first positioning slot and the first pins are inserted into the first hot plug sockets, the first shaft body is electrically connected to the PCB board.

As an improvement of the present invention, the keys further include a plurality of second keys. A length of the second keys is greater than a length of the first keys. The second keys include a second key cap, at least one second shaft body, and at least two third shaft bodies. The second key cap is detachably installed at a top of the second shaft body and the third shaft bodies, and a bottom of the second shaft body is equipped with a second positioning column and second pins. The installation part further includes a second installation part. The second installation part includes a second positioning slot and second hot plug sockets. The second positioning column is installed in the second positioning slot and the second pins are inserted into the second hot plug sockets to fix the second shaft body on the second installation part. The third shaft bodies are equipped with an opening, and the second keys further include a balance rod. Both ends of the balance rod are equipped with an extension rod. The extension rod is inserted into the opening, so that the balance rod rotates in conjunction with at least two third shaft bodies simultaneously.

As an improvement of the present invention, the second keys include at least one of an enter key, a space key, and an uppercase key.

As an improvement of the present invention, the key device further includes an insulating rubber pad. The insulating rubber pad is provided above the base, and the insulating rubber pad is located between the PCB board and the base.

As an improvement of the present invention, a surface of the base is equipped with a third positioning column. The insulating rubber pad is equipped with a third positioning hole, and the PCB board is equipped with a fourth positioning hole. The third positioning hole and the fourth positioning hole are sequentially installed on the third positioning column, so that the insulating rubber pad and the PCB board are sequentially laid and fixed on the base.

As an improvement of the present invention, the key device further includes a control motherboard. The control motherboard is electrically connected to the PCB board. The control motherboard is equipped with a video interface. The video interface is electrically connected to the display body.

As an improvement of the present invention, a surface of the base is equipped with a fourth positioning column, and the control motherboard is equipped with a fifth positioning hole. The fifth positioning hole is installed on the fourth positioning column to enable the control motherboard to be installed on the base.

As an improvement of the present invention, the display body includes a wall panel and a baffle. The wall panel and the baffle are combined to form a display screen installation slot. The display body further includes a display screen. The display screen is installed in the display screen installation slot. The wall panel is connected to the connector.

As an improvement of the present invention, the extended display screen further includes a data interface and a power interface. The data interface and the power interface are electrically connected to the control motherboard.

As an improvement of the present invention, the extended display screen further includes foot pads. The foot pads are located at a bottom of the key device.

As an improvement of the present invention, the foot pads include first foot pads and second foot pads. The first foot pads are arranged at one end of a bottom of the key device, and the second foot pads are arranged at an other end of the bottom of the key device. A height of the first foot pads is a first distance, and a height of the second foot pads is a second distance. The first distance is less than the second distance.

The extended display screen is provided in the present invention, including the display body, the key device. The key device is connected to the display body, and the key device is electrically connected to the display body. By integrating the display body and the key device together, an integrated design of a display device and a keyboard device is achieved, making the device more compact, easy to carry, and simplifying an assembly and use process of the device. At the same time, due to the integrated design, the extended display screen doesn't need to use an external bracket, reducing occupation of desktop space, making the user's working area cleaner and more compact. Besides, the key device is electrically connected to the display body, which means that power wires and data wires of the device can be integrated through the integrated design, reducing wire confusion, improving an overall aesthetic appearance, and greatly enhancing user experience.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
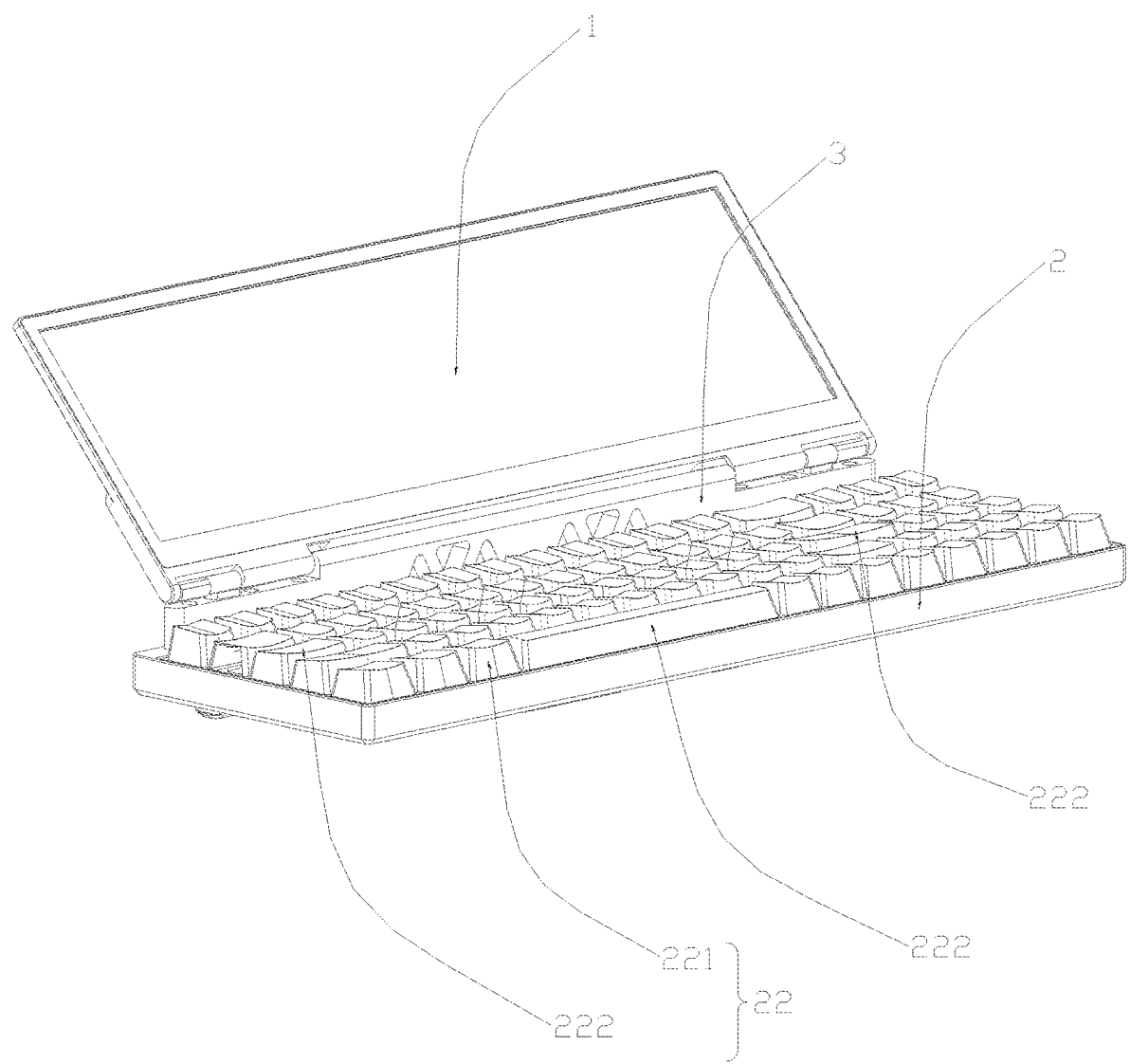
FIG. 1 is a schematic diagram of an overall structure according to the present invention.
Figure 2:
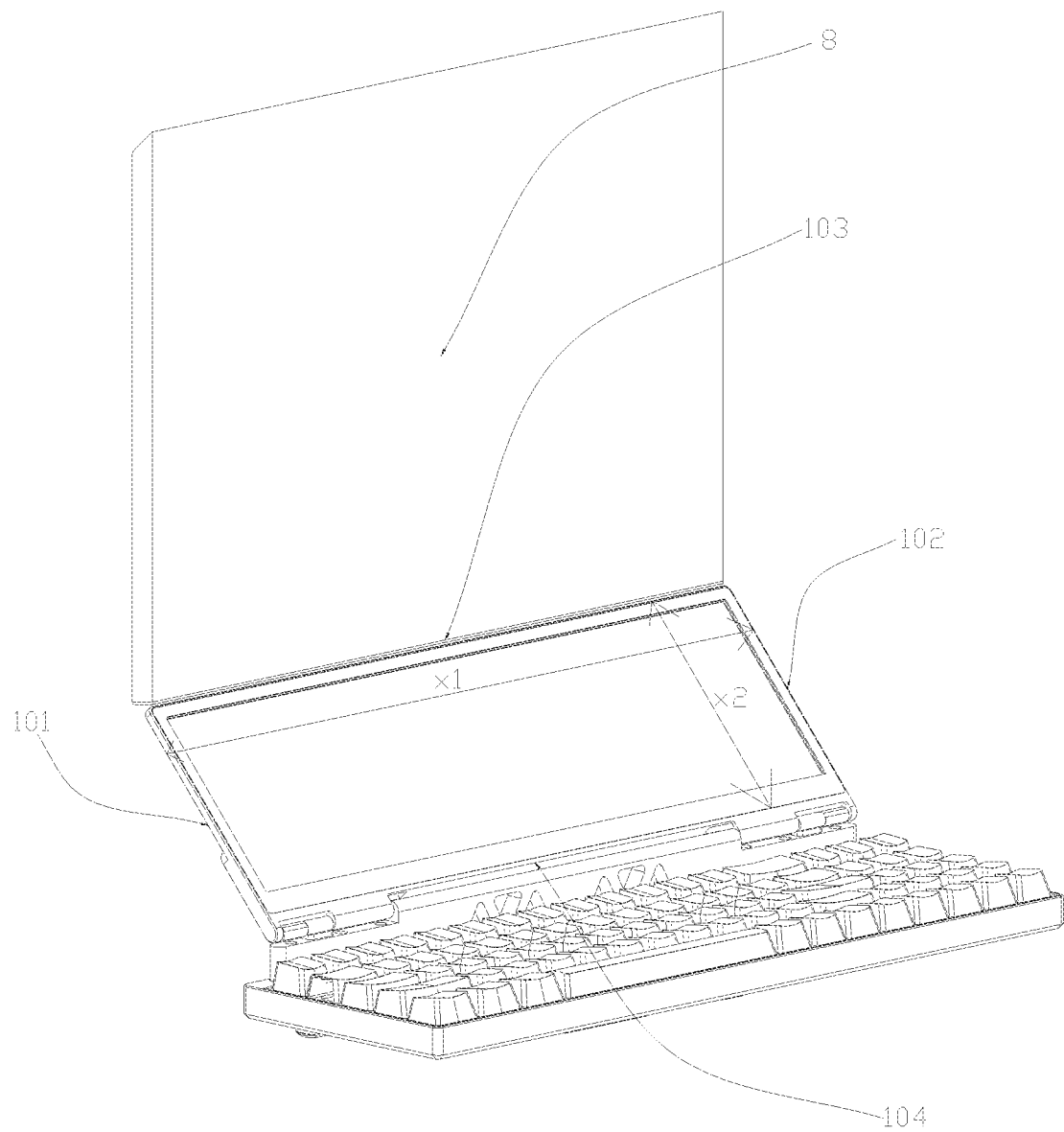
FIG. 2 is a usage state diagram according to the present invention.
Figure 3:
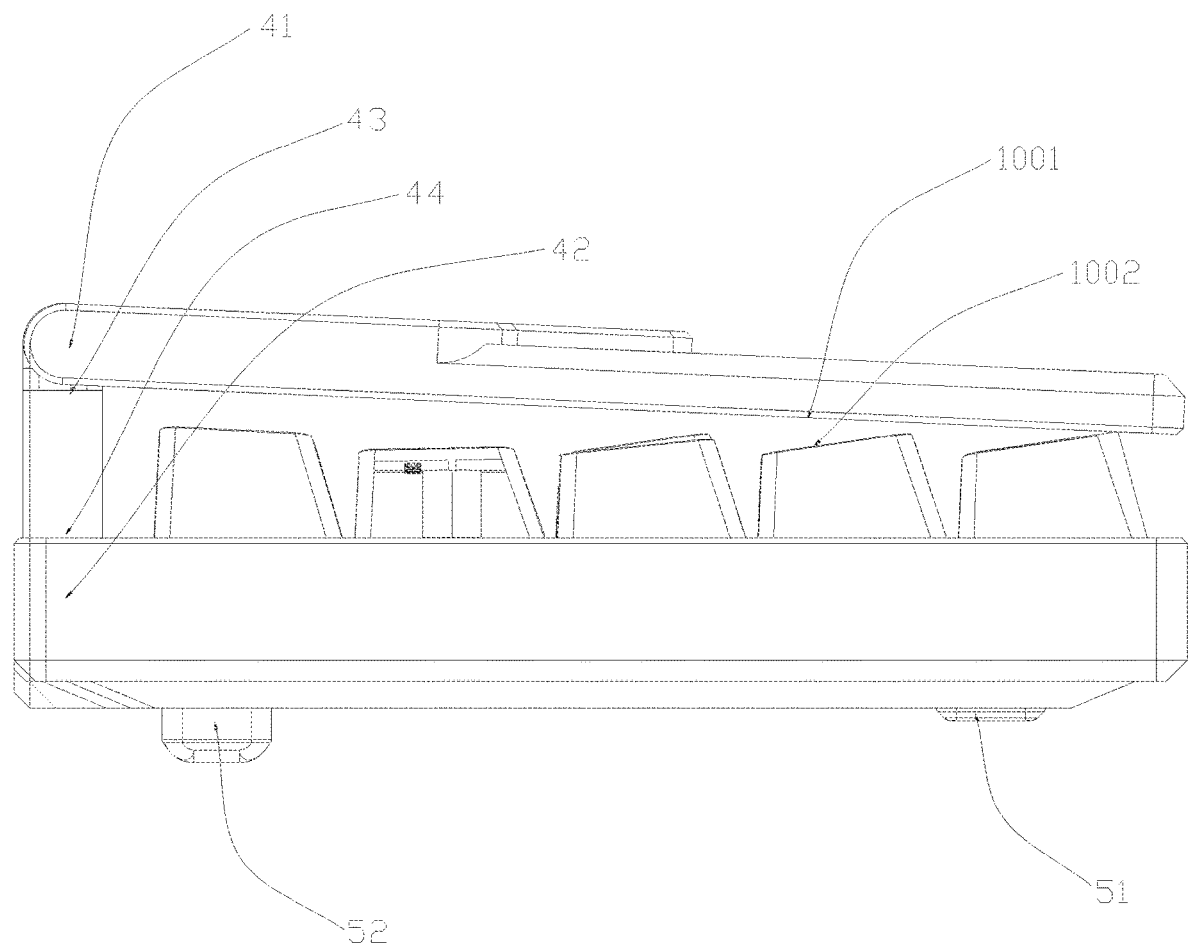
FIG. 3 is a side view of an overall structure according to the present invention.
Figure 4:
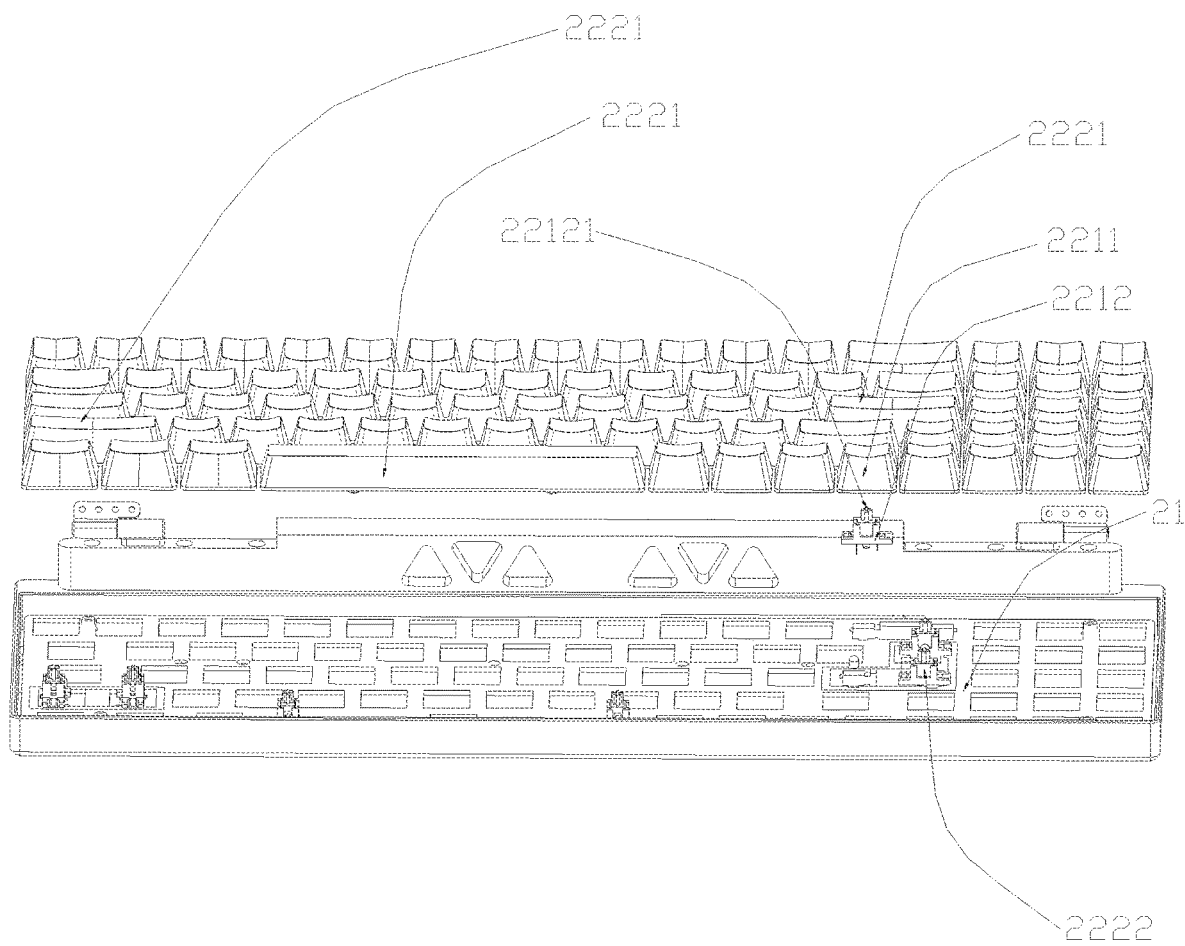
FIG. 4 is an exploded view of a key device according to the present invention.
Figure 5:
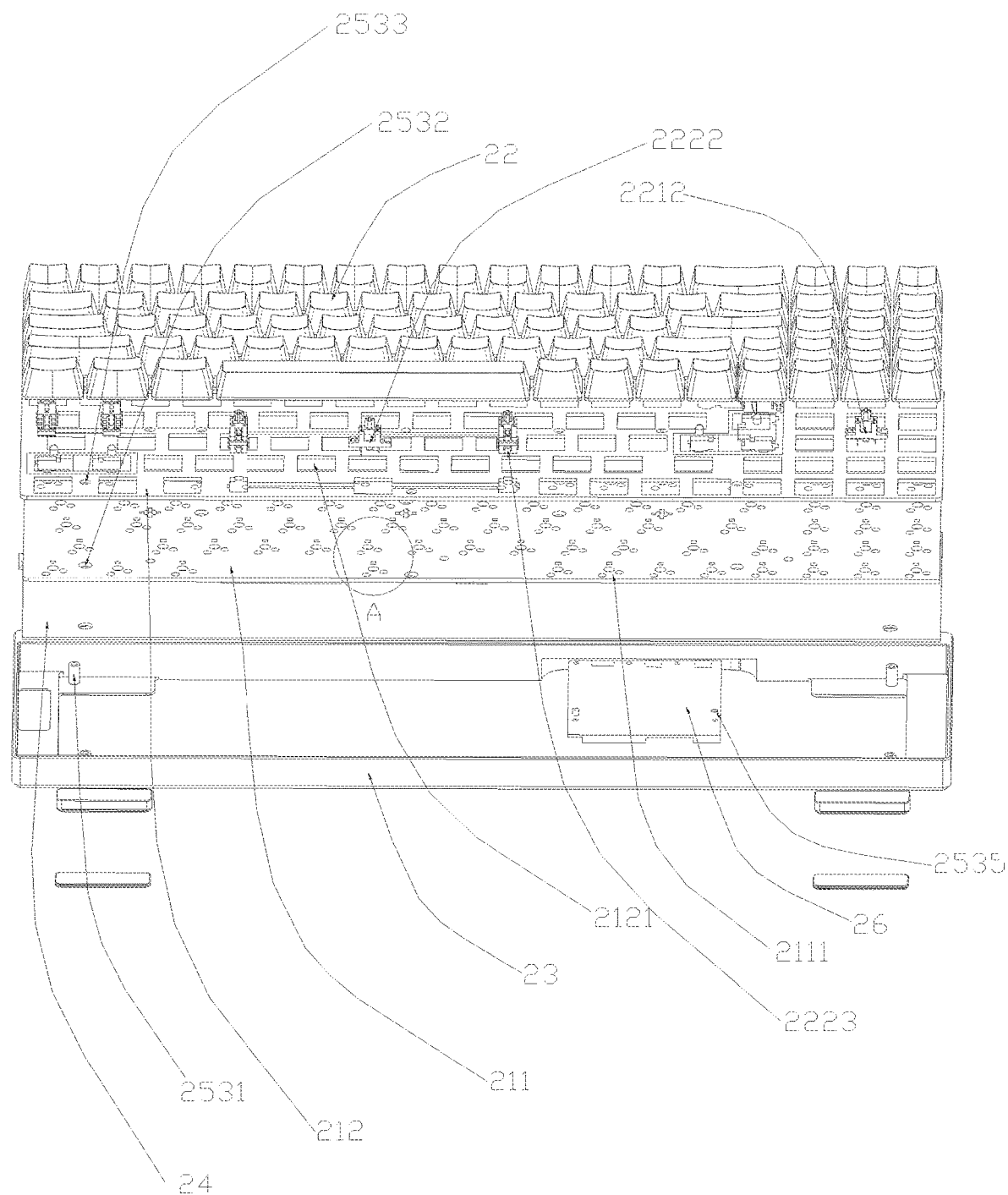
FIG. 5 is another exploded view of a key device according to the present invention.
Figure 6:
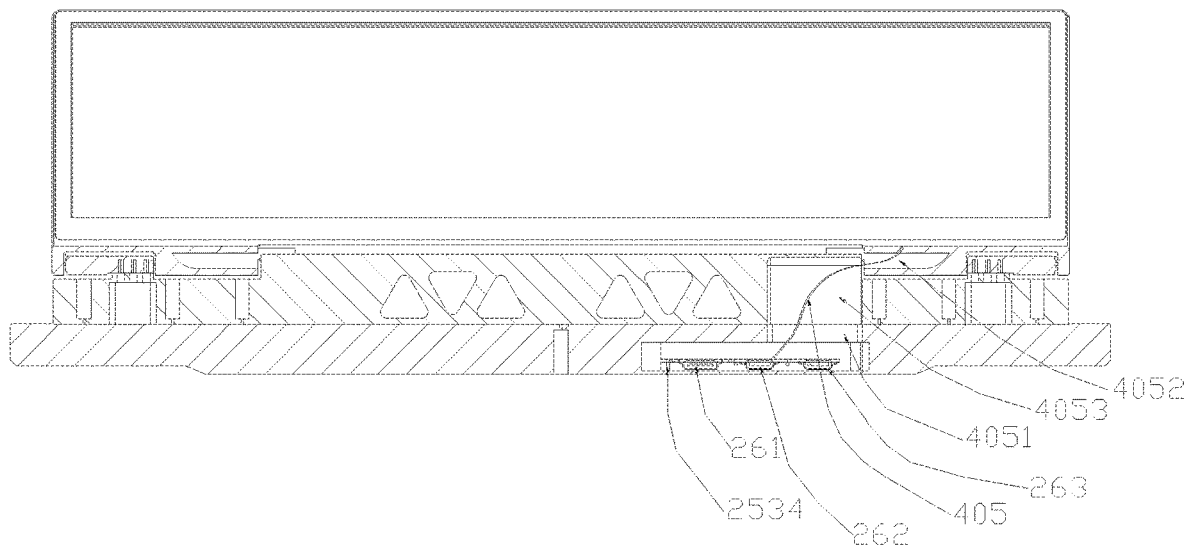
FIG. 6 is a sectional view along a connector according to the present invention.
Figure 7:
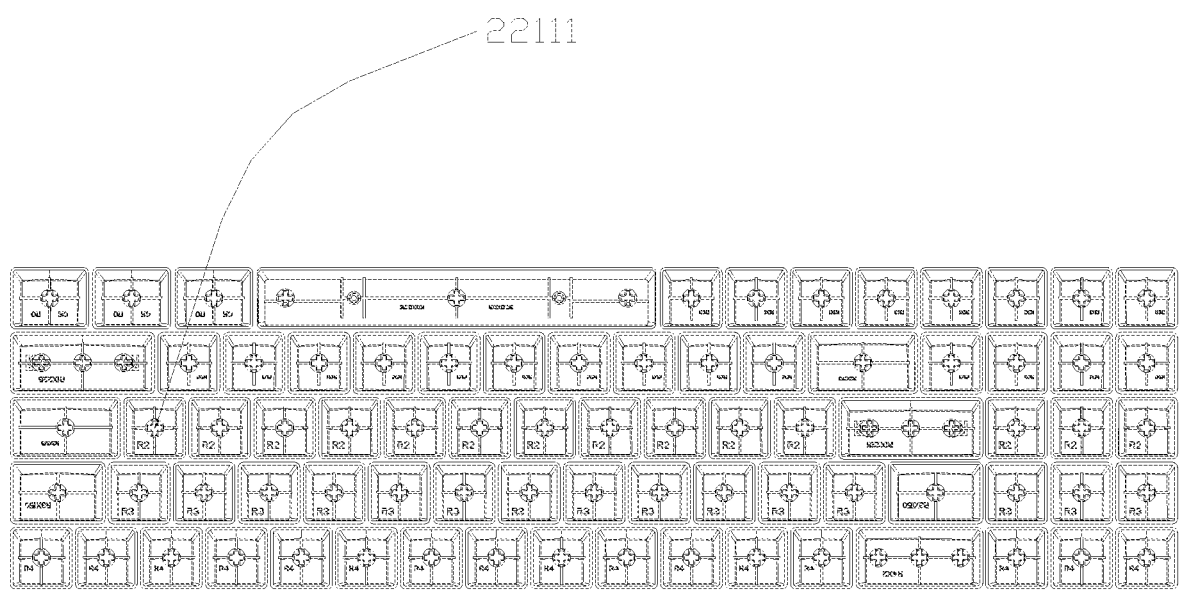
FIG. 7 is a bottom view of key cap according to the present invention.
Figure 8:
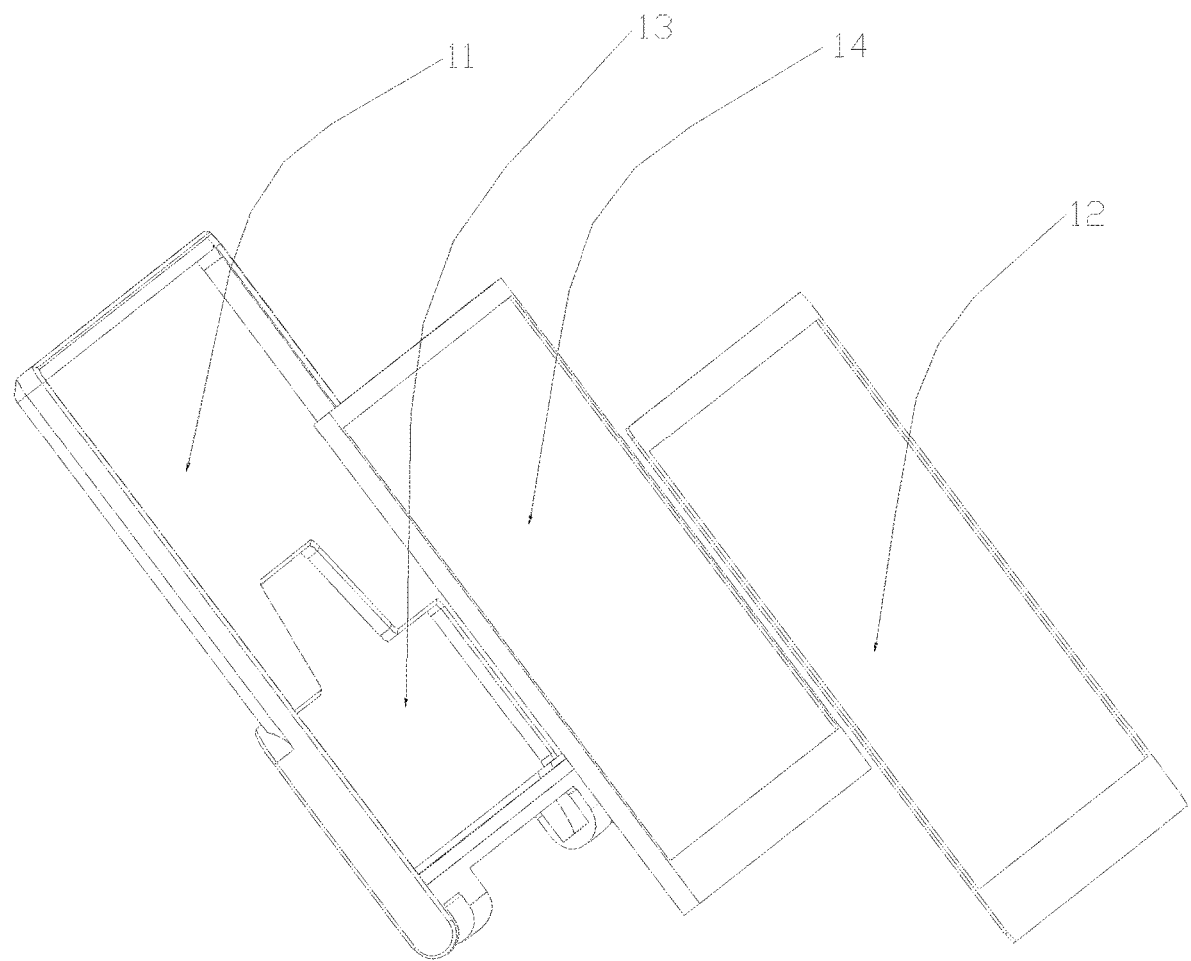
FIG. 8 is an exploded view of a display body according to the present invention.
Figure 9:
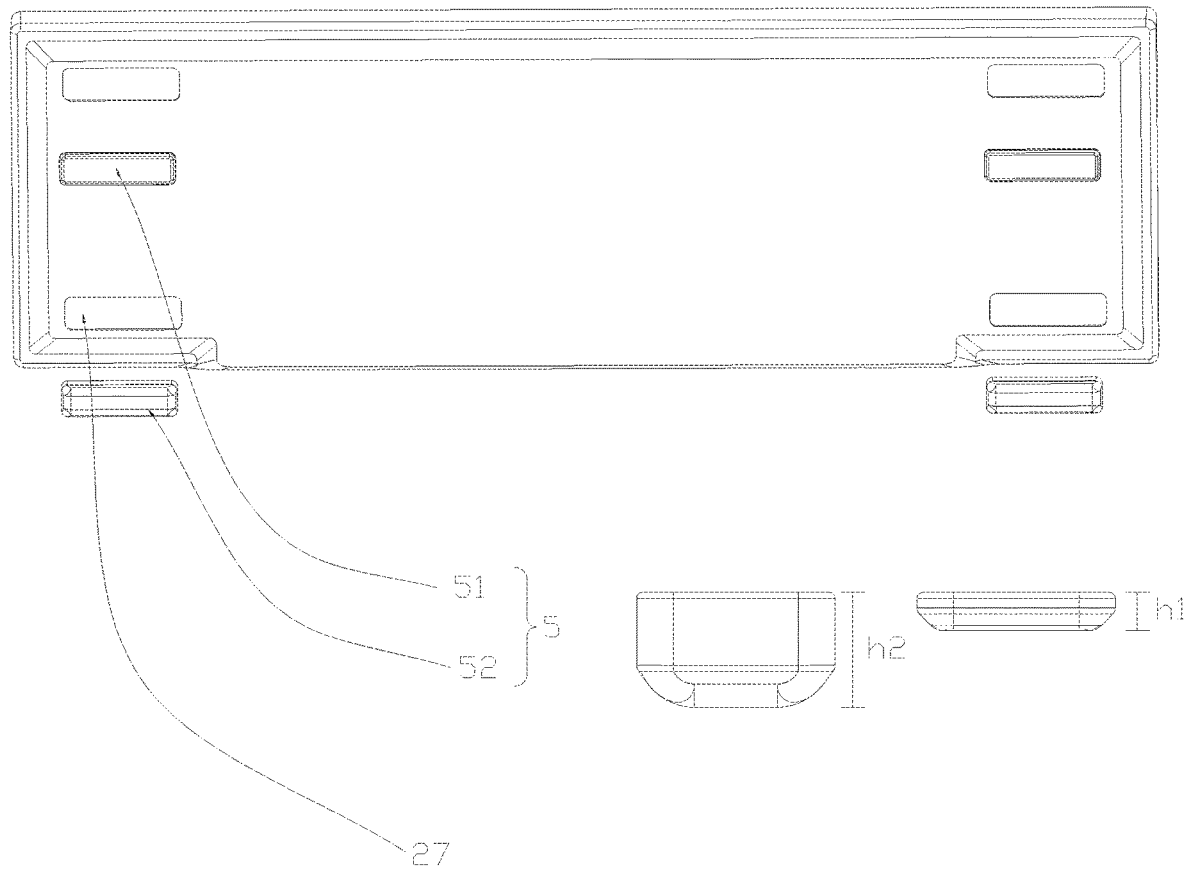
FIG. 9 is an exploded view of foot pads according to the present invention.
Figure 10:
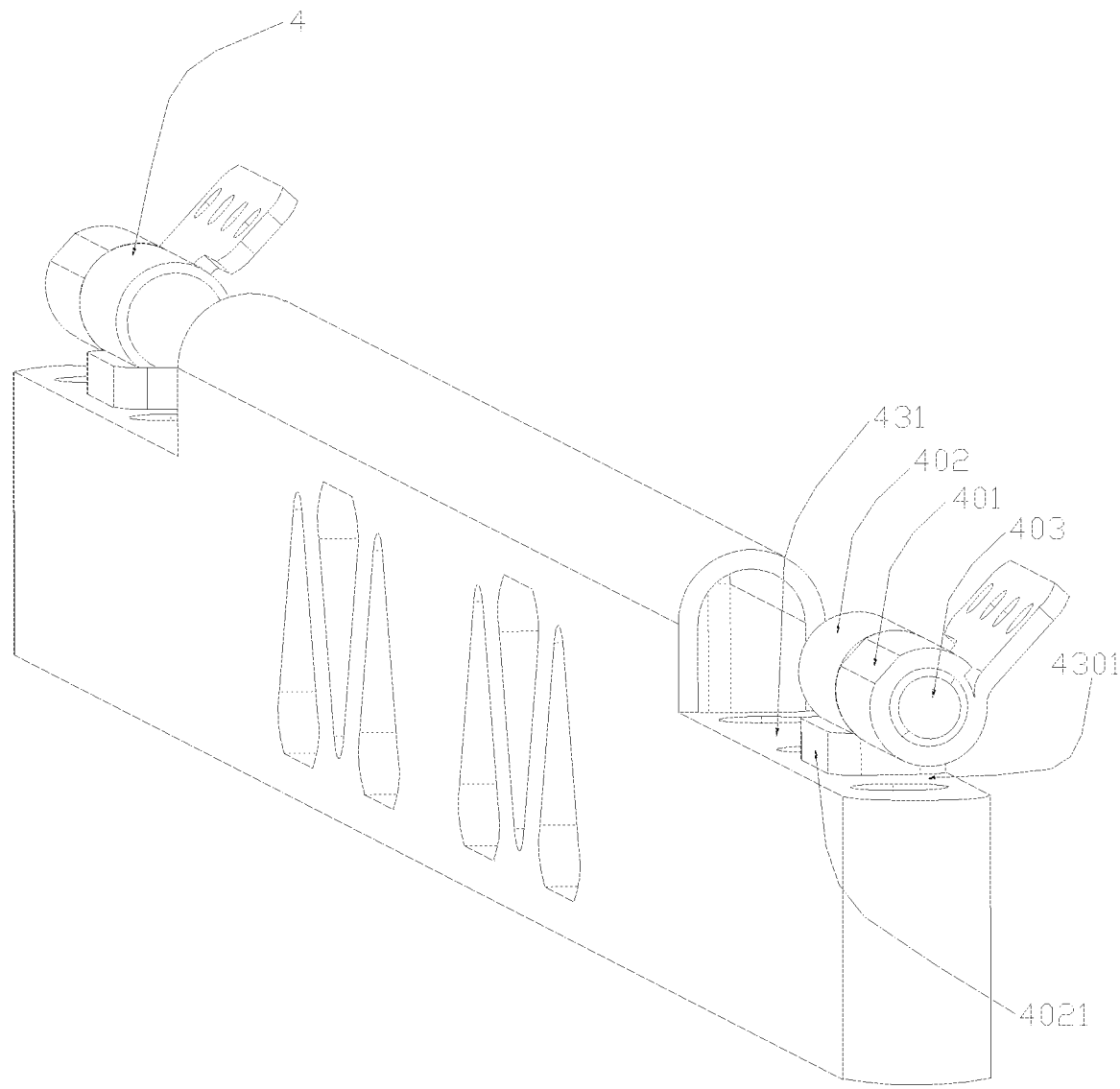
FIG. 10 is a schematic diagram of an overall structure of a connector according to the present invention.
Figure 11:
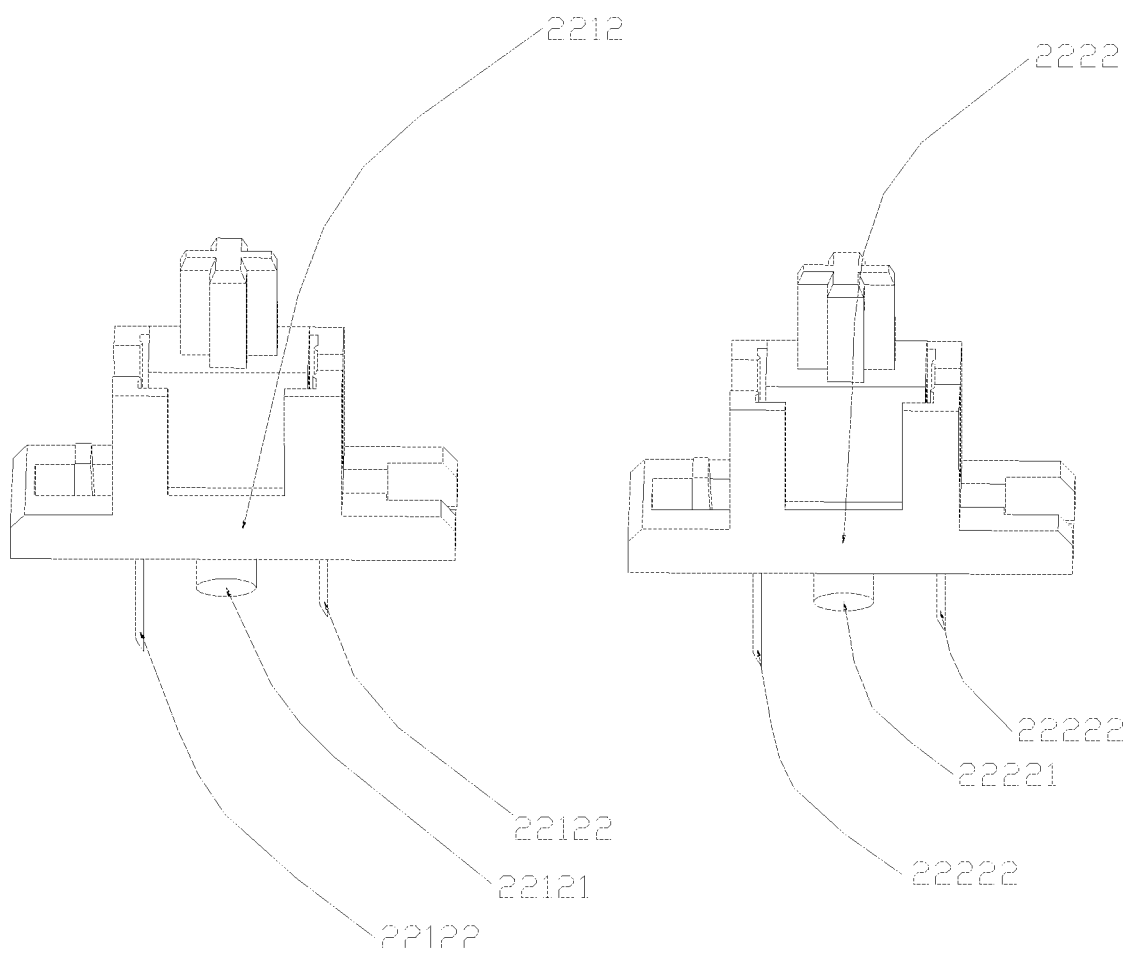
FIG. 11 is a schematic diagram of an overall structure of a first shaft body and a second shaft body according to the present invention.
Figure 12:
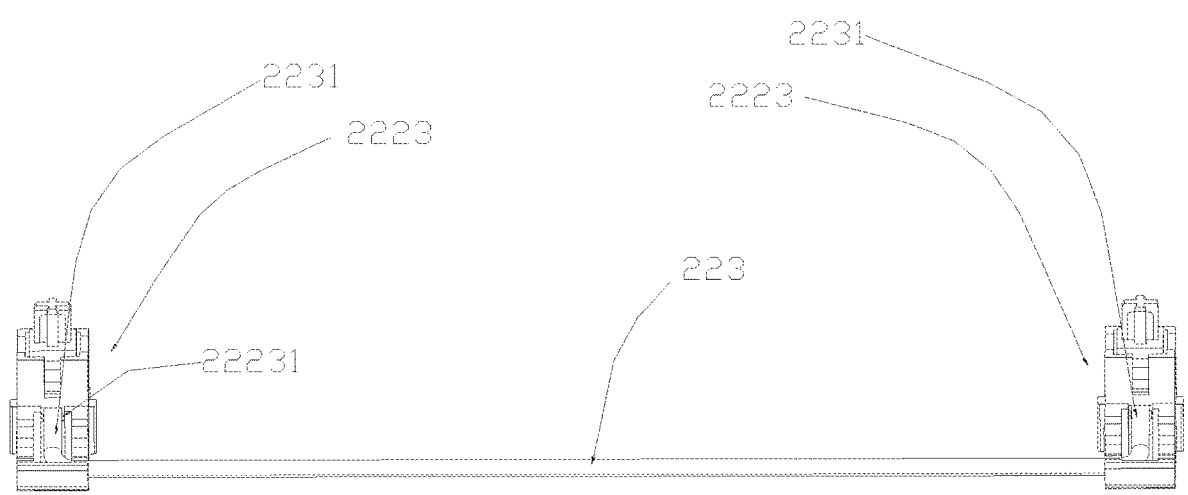
FIG. 12 is a schematic diagram of an overall structure of third shaft bodies according to the present invention.
Figure 13:
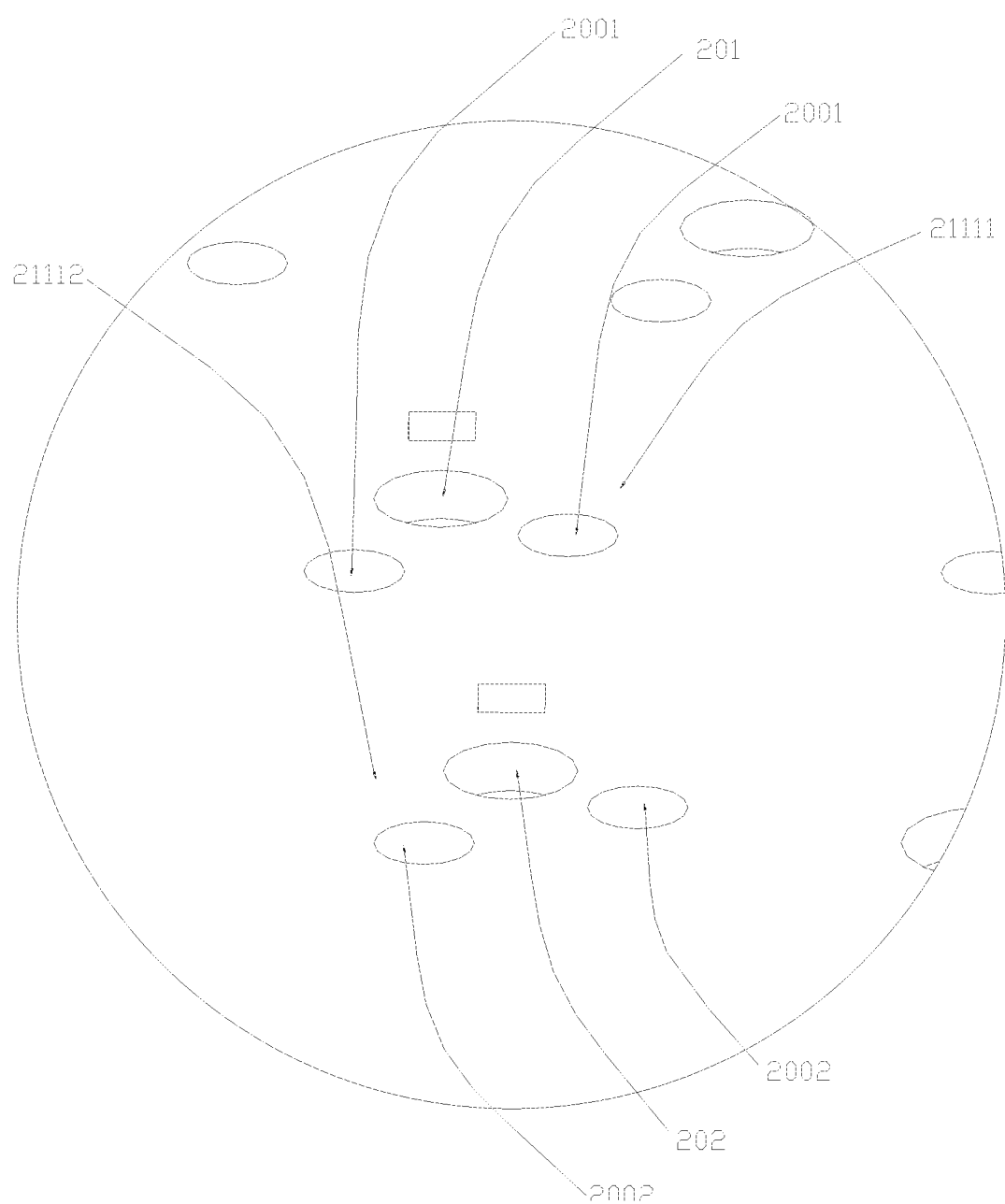
FIG. 13 is a partial enlargement view of area A in FIG. 4 according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1 to 14, an extended display screen includes a display body 1 and a key device 2. The key device 2 is connected to the display body 1, and the key device 2 is electrically connected to the display body 1. By integrating the display body 1 and the key device 2 together, an integrated design of a display device and a keyboard device is achieved, making the device more compact, easy to carry, and simplifying an assembly and use process of the device. At the same time, due to the integrated design, the extended display screen does not need to use an external bracket, reducing occupation of desktop space, making a user's working area cleaner and more compact. In addition, the key device 2 is electrically connected to the display body 1, which means that power wires and data wires of the device can be integrated through the integrated design, reducing confusion of the wires, improving an overall aesthetic appearance, and greatly enhancing user experience.

In this embodiment, the display body includes a left side 101, a right side 102, an upper side 103, and a lower side 104. A distance from the left side 101 to the right side 102 is a first distance x1, and the first distance x1 is 28 cm-39 cm. A distance from the upper side 103 to the lower side 104 is a second distance x2, and a length of the second distance x2 is 7 cm-16 cm.

In this embodiment, the lower side 104 of the display body 1 is rotatably connected to the key device 2, so that the upper side 103 of the display body 1 is brought close to a lower end of a main display device 8 via rotation. The display body 1 is capable of rotating to a position where a display surface 1001 of the display body 1 abuts against a front surface 1002 of the key device 2. Through the above structure, when an extended screen is used, the display body 1 is rotatably connected, so that the user can adjust a viewing angle of the extended display screen according to personal needs, and the upper side 103 is close to the lower end of the main display device 8, reducing a distance between two displays and providing the user with a more comfortable visual experience. In addition, when the extended display screen is not used, the display body 1 can be rotated to abut against the key device 2. After the display body 1 abuts against the key device 2, a more compact structure is formed, thereby effectively reducing a space occupied by the device and facilitating the user to carry.

In this embodiment, the extended display screen further includes a connector 3. The display body 1 includes a first end 41. The key device 2 includes a second end 42. The connector 3 includes a third end 43 and a fourth end 44, and the fourth end 44 is opposite to the third end 43. The third end 43 of the connector 3 is rotatably connected to the first end 41 of the display body 1, and the fourth end 44 of the connector 3 is connected to the second end 42 of the key device 2. Through the above structure, the user can rotate the display body 1 and the key device 2 more flexibly. Moreover, the connector 3 provides a certain gap between the display body 1 and the key device 2 to avoid conflicts during rotation.

In this embodiment, the extended display screen further includes a rotating device 4. The rotating device 4 includes a first rotating member 401, a second rotating member 402, and a shaft 403. The first rotating member 401 and second rotating member 402 are sleeved on the shaft 403, so that the first rotating member 401 is rotatable relative to the second rotating member 402. The first rotating member 401 is connected to the first end 41 of the display body 1, and the second rotating member 402 is connected to an end surface of the third end 43 of the connector 3, so that the display body 1 is rotatably connected to the connector 3. The first rotating member 401 is tightly connected to the shaft 403, and the second rotating member 402 is tightly connected to the shaft 403, so as to create a certain resistance when the rotating device 4 rotates, thereby facilitating the display body 1 to rotate to any angle and to be fixed.

In this embodiment, the second rotating member 402 further includes a gasket 4021, and the third end 43 of the connector 3 further includes an end surface 431. The gasket 4021 is installed on the end surface 431 of the third end 43 of the connector 3, and the second rotating member 402 is connected above the end surface 431, so that the first rotating member 401 together with the end surface of the third end 43 of the connector 3 forms a first gap 4301. The gasket 4021 is used for forming the first gap 4301 between the display body 1 and the end surface of the third end 43 of the connector 3, to avoid collision during rotation, and to enable the display body 1 to rotate until the display surface 1001 of the display body 1 abuts against the front surface 1002 of the key device 2.

In this embodiment, the extended display screen further includes a wire 405. The second end 42 of the key device 2 is provided with a first wiring through hole 4051. The first end 41 of the display body 1 is provided with a second wiring through hole 4052, and the connector 3 is provided with a through wiring channel 4053. A lower end of the wiring channel 4053 is in communication with the first wiring through hole 4051, and an upper end of the wiring channel 4053 is in communication with the second wiring through hole 4052. One end of the wire 405 is connected to the key device 2, and the other end of the wire 405 passes through the first wiring through hole 4051, the wiring channel 4053, and the second wiring through hole 4052 in sequence and is electrically connected to the display body 1. Through the above structure, a wiring structure between the display body 1 and the key device 2 is hidden inside, making the entire extended display screen look simpler and more aesthetically pleasing without exposed connection wires, and also preventing the connection wires of the keyboard and the display from crossing and wrapping externally to prevent tangle of wires, thereby reducing a trouble of maintaining and organizing wires. In addition, the internal wiring structure can effectively protect the connection wires from damage caused by collisions with external objects during use.

In this embodiment, the key device 2 includes an installation seat 21 and a plurality of separate keys 22. The plurality of separate keys 22 are detachably inserted onto the installation seat 21. The detachable keys 22 make cleaning a keyboard easier, and the user can remove the keys to clean an interior to extend service life. In addition, the detachable keys 22 allow the user to replace different keys according to different needs.

In this embodiment, the keys 22 include a plurality of first keys 221. The first keys 221 include a first key cap 2211 and a first shaft body 2212. A bottom of the first shaft body 2212 is detachably inserted on the installation seat 21, and a cross shaped slot 22111 is provided at a center of a bottom of the first key cap 2211. A top of the first shaft body 2212 is provided with a raised cross shaped shaft center 22121, and the slot 22111 is detachably connected to the shaft center 22121 to make the first shaft body 2212 detachably connected to the first key cap 2211. Through the above structure, the user can disassemble the first shaft body 2212 and the first key cap 2211. The user can replace the key cap according to personal preferences and choose key cap of different colors, shapes, or materials, thereby achieving personalized customization of the keyboard. In addition, if a key cap is damaged, the user can easily remove the corresponding key cap and replace it without replacing the entire keyboard, thereby reducing maintenance costs and time, and extending a lifespan of the keyboard.

In this embodiment, the key device 2 further includes a base 23, and the installation seat 21 is installed on the base 23. The installation seat 21 includes a PCB board 211 and a positioning board 212. The PCB board 211 is equipped with an installation part 2111 for correspondingly installing the keys 22. The positioning board 212 is equipped with a plurality of positioning holes 2121, and a position of the positioning holes 2121 corresponds one by one to a position of the installation part 2111. The installation part 2111 includes a first installation part 21111. The first keys 221 pass through the positioning holes 2121 and are detachably installed on the first installation part 21111 of the PCB board 211. Through the above structure, the positioning holes 2121 of the positioning board 212 is capable of accurately positioning an installation of the first shaft body 2212, ensuring that the first shaft body 2212 can be firmly installed on the PCB board 211, and avoiding looseness or shaking of the shaft body during use.

In this embodiment, the first shaft body 2212 is equipped with a first positioning column 22120 and first pins 22122. The first installation part 21111 includes a first positioning slot 201 and first hot plug sockets 2001. When the first positioning column 22120 is installed in the first positioning slot 201 and the first pins 22122 are inserted into the first hot plug sockets 2001, the first shaft body 2212 is electrically connected to the PCB board 211. Through the above structure, the first shaft body 2212 is inserted into the first hot plug sockets 2001 through the first pins 22122. This design enables the keyboard to support hot plug function as a whole, allowing the user to insert or remove the first shaft body 2212 while the device is running without shutting down the device, thereby improving usability of the device.

In this embodiment, the keys 22 further include a plurality of second keys 222. A length of the second keys 222 is greater than a length of the first keys 221. The second keys 222 include a second key cap 2221, at least one second shaft body 2222, and at least two third shaft bodies 2223. The second key cap 2221 is detachably installed at a top of the second shaft body 2222 and the third shaft bodies 2223, and a bottom of the second shaft body 2222 is equipped with a second positioning column 22221 and second pins 22222. The installation part 2111 further includes a second installation part 21112. The second installation part 21112 includes a second positioning slot 202 and second hot plug sockets 2002. The second positioning column 22221 is installed in the second positioning slot 202 and the second pins 22222 are inserted into the second hot plug sockets 2002 to fix the second shaft body 2222 on the second installation part 21112. The third shaft bodies 2223 are equipped with an opening 22231, and the second keys 222 further include a balance rod 223. Both ends of the balance rod 223 are equipped with an extension rod 2231. The extension rod 2231 is inserted into the opening 22231, so that the balance rod 223 rotates in conjunction with at least two third shaft bodies 2223 simultaneously. Furthermore, the second keys 222 include at least one of an enter key, a space key, and an uppercase key. Through a design of the balance rod 223, when the user presses the second keys 222 (such as the enter key, the space key, or the uppercase key), pressure on the keys is distributed by connecting the extension rod 2231 at both ends to at least two third shaft bodies 2223, thereby ensuring the keys remain stable during use and avoid tilting. By installing the extension rod 2231 at both ends and inserting the extension rod 2231 into the opening 22231, the balance rod 223 is supported in both directions, which can reduce a lateral shaking of the keys during use and improve the user experience. In addition, through a rotation of the extension rod 2231 together with the third shaft bodies 2223, the balance rod 223 ensures that the keys are capable of quickly and smoothly returning to an original position after release, improving a reset effect of the keys 22.

In this embodiment, the key device 2 further includes an insulating rubber pad 24. The insulating rubber pad 24 is provided above the base 23, and the insulating rubber pad 24 is located between the PCB board 211 and the base 23. Through the above structure, a design of the insulating rubber pad 24 can provide certain shock absorption and buffering effects when the user presses a key. In addition, the insulating rubber pad 24 is located between the PCB board 211 and the base 23, providing a certain degree of protection. The insulating rubber pad 24 is capable of preventing a material of the base 23 from directly contacting the PCB board 211, so as to avoid scratches, wear, or damage to the PCB board 211, thereby extending a service life of the PCB board 211.

In this embodiment, a surface of the base 23 is equipped with a third positioning column 2531. The insulating rubber pad 24 is equipped with a third positioning hole 2532, and the PCB board 211 is equipped with a fourth positioning hole 2533. The third positioning hole 2532 and the fourth positioning hole 2533 are sequentially installed on the third positioning column 2531, so that the insulating rubber pad 24 and the PCB board 211 are sequentially laid and fixed on the base 23. Through the above structure, the insulating rubber pad 24 and the PCB board 211 can be accurately installed on the base 23, allowing the insulating rubber pad 24 and the PCB board 211 to be placed smoothly and stably on the base 23, avoiding movement or shaking of internal components of the keyboard, and improving user experience.

In this embodiment, the key device 2 further includes a control motherboard 26. The control motherboard 26 is electrically connected to the PCB board 211. The control motherboard 26 is equipped with a video interface 261. The video interface 261 is electrically connected to the display body 1. Through the above structure, an electrical signal from the keyboard and a signal from the display are integrated into the control motherboard 26, simplifying a circuit structure of a system, reducing complexity, and improving reliability of an entire equipment.

In this embodiment, a surface of the base 23 is equipped with a fourth positioning column 2534, and the control motherboard 26 is equipped with a fifth positioning hole 2535. The fifth positioning hole 2535 is installed on the fourth positioning column 2534 to enable the control motherboard 26 to be installed on the base 23. Through the above structure, the control motherboard 26 can be securely installed on the base 23 to prevent unnecessary movement or vibration when the keyboard is used, ensuring stability of the keyboard during use.

In this embodiment, the display body 1 includes a wall panel 11 and a baffle 12. The wall panel 11 and the baffle 12 are combined to form a display screen installation slot 13. The display body 1 further includes a display screen 14. The display screen 14 is installed in the display screen installation slot 13. The wall panel 11 is connected to the connector 3. The baffle 12 is capable of effectively preventing external objects, dust, or other substances from damaging an edge of a surface of the display screen 14, improving durability of the display screen. As part of the display body 1, the baffle 12 is also capable of increasing an overall structural strength. By covering the display screen, the baffle 12 is capable of increasing a lifespan of the display screen by sharing external impacts.

In this embodiment, the extended display screen further includes a data interface 262 and a power interface 263. The data interface 262 and the power interface 263 are electrically connected to the control motherboard 26. The control motherboard 26 integrates a signal of the display screen and a signal of the keyboard, and transmits data through the separate data interface 262 and supplies power through the separate power interface 263. Through the above structure, a total number of connection wires is reduced, and a wiring of the device is simplified, facilitating the user to wire the device and maintain desktop cleanliness, thereby improving the user experience.

In this embodiment, the extended display screen further includes foot pads 5. The foot pads 5 are located at a bottom of the key device 2. The bottom of the key device 2 is equipped with foot pad installation slots 27, and the foot pads 5 are detachably installed in the foot pad installation slots 27. Through the above structure, the key device 2 can be prevented from sliding or shaking during use. Besides, the foot pads 5 have a certain shock absorption effect, and are capable of absorbing some external impacts to reduce the impacts on the device. Meanwhile, the foot pads 5 are also capable of protecting a bottom of the device from being scratched by hard surfaces. In addition, a detachable design is adopted on the foot pads 5, allowing the user to easily install or remove the foot pads 5. This design helps the user adjust, remove, or clean the foot pads according to an actual need.

In this embodiment, the foot pads 5 include first foot pads 51 and second foot pads 52. The first foot pads 51 are arranged at one end of a bottom of the key device 2, and the second foot pads 52 are arranged at the other end of the bottom of the key device 2. A height of the first foot pads 51 is a third distance h1, and a height of the second foot pads 52 is a fourth distance h2. The third distance h1 is less than the fourth distance h2. Through the above structure, a height difference between the first foot pads 51 and the second foot pads 52 causes the bottom of the key device 2 to be tilted, which conforms to ergonomic principles, helps maintain a natural posture of the user's wrist and arm, and can provide a more comfortable keyboard input angle, thereby helping reduce wrist fatigue.

Figure 14:
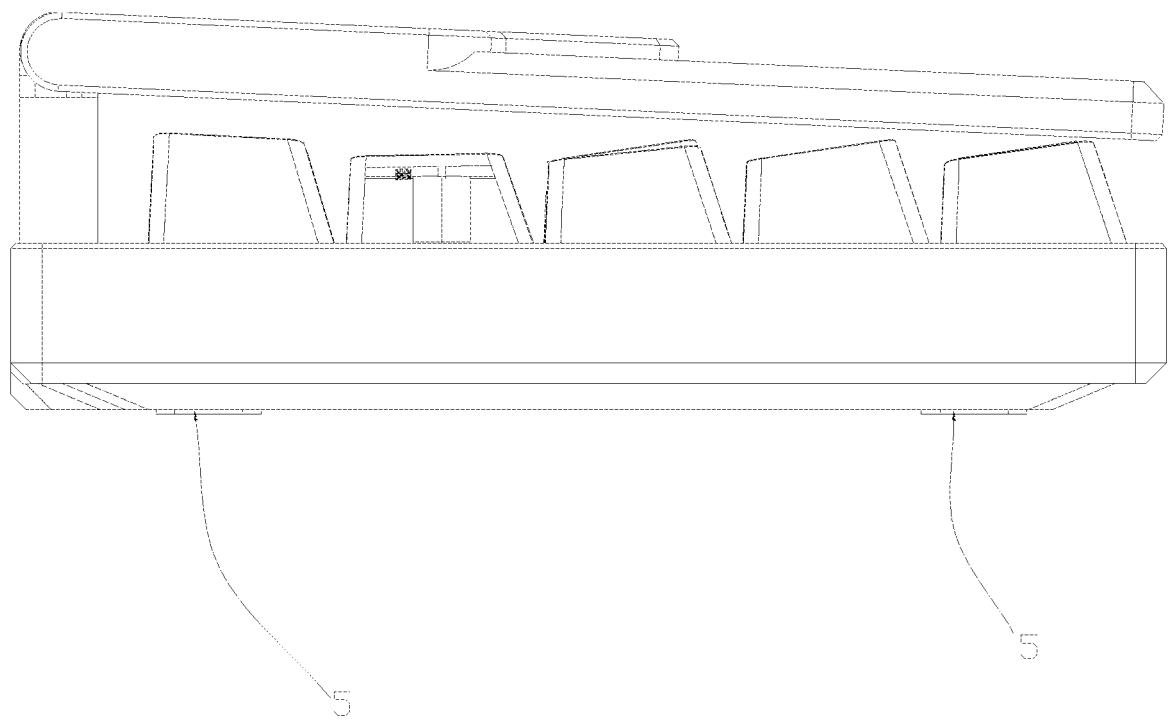
FIG. 14 is a side view of an overall structure in another embodiment according to the present invention.

As shown in FIG. 14, in another embodiment, the foot pads 5 are embedded. The foot pads 5 are glued or directly embedded into the foot pad installation slots 27, and a height of the foot pads 5 are 1 mm to 5 mm higher than a depth of the foot pad installation slots 27 to make a bottom of the key device 2 abut against a desktop as much as possible, so that the overall height of the key device 2 is lower, allowing the user to maintain a wrist in a more natural position and reducing wrist fatigue during use.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. An extended display screen, comprising:
   a display body;
   a key device, wherein the key device is connected to the display body, and the key device is electrically connected to display body;
   a connector, wherein the display body comprises a first end, the key device comprises a second end, the connector comprises a third end and a fourth end, and the fourth end is opposite to the third end; the third end of the connector is rotatably connected to the first end of the display body, and the fourth end of the connector is connected to the second end of the key device; and
   a rotating device, wherein the rotating device comprises a first rotating member, a second rotating member, and a shaft; the first rotating member and the second rotating member are sleeved on the shaft, so that the first rotating member is rotatable relative to the second rotating member; the first rotating member is connected to the first end of the display body, and the second rotating member is connected to an end surface of the third end of the connector, so that the display body is rotatably connected to the connector;
   wherein the second rotating member further comprises a gasket, and the third end of the connector further comprises an end surface; the gasket is installed on the end surface of the third end of the connector, and the second rotating member is connected above the end surface, so that the first rotating member together with the end surface of the third end of the connector forms a first gap.

2. The extended display screen of claim 1, wherein the display body comprises a left side, a right side, an upper side, and a lower side; a distance from the left side to the right side is a first distance, and the first distance is 28 cm-39 cm; a distance from the upper side to the lower side is a second distance, and a length of the second distance is 7 cm-16 cm.

3. The extended display screen of claim 2, wherein the lower side of the display body is rotatably connected to the key device, so that the upper side of the display body is brought close to a lower end of a main display device via rotation; the display body is capable of rotating to a position where a display surface of the display body abuts against a front surface of the key device.

4. An extended display screen, comprising:
a display body;
a key device, wherein the key device is connected to the display body, and the key device is electrically connected to display body;
a connector, wherein the display body comprises a first end, the key device comprises a second end, the connector comprises a third end and a fourth end, and the fourth end is opposite to the third end; the third end of the connector is rotatably connected to the first end of the display body, and the fourth end of the connector is connected to the second end of the key device; and
a wire, wherein the second end of the key device is provided with a first wiring through hole, the first end of the display body is provided with a second wiring through hole, and the connector is provided with a through wiring channel; a lower end of the wiring channel is in communication with the first wiring through hole, and an upper end of the wiring channel is in communication with the second wiring through hole; one end of the wire is connected to the key device, an other end of the wire passes through the first wiring through hole, the wiring channel and the second wiring through hole in sequence and is electrically connected to the display body.

5. The extended display screen of claim 1, wherein the key device comprises an installation seat and a plurality of separate keys, and the plurality of separate keys are detachably inserted onto the installation seat.

6. The extended display screen of claim 5, wherein the keys comprise a plurality of first keys, and the first keys comprise a first key cap and a first shaft body; a bottom of the first shaft body is detachably inserted on the installation seat, and a cross shaped slot is provided at a center of a bottom of the first key cap; a top of the first shaft body is provided with a raised cross shaped shaft center, and the slot is detachably connected to the shaft center, so that the first shaft body is detachably connected to the first key cap.

7. The extended display screen of claim 5, wherein the key device further comprises a base; the installation seat is installed on the base, and the installation seat comprises a PCB board and a positioning board; the PCB board is equipped with an installation part for correspondingly installing the keys, the positioning board is equipped with a plurality of positioning holes, and a position of the positioning holes corresponds one by one to a position of the installation part; the installation part comprises a first installation part; the first keys pass through the positioning holes and are detachably installed on the first installation part of the PCB board.

8. The extended display screen of claim 7, wherein the first shaft body is equipped with a first positioning column and first pins, and the first installation part comprises a first positioning slot and first hot plug sockets; when the first positioning column is installed in the first positioning slot and the first pins are inserted into the first hot plug sockets, the first shaft body is electrically connected to the PCB board.

9. The extended display screen of claim 7, wherein the keys further comprise a plurality of second keys, and a length of the second keys is greater than a length of the first keys; the second keys comprise a second key cap, at least one second shaft body, and at least two third shaft bodies; the second key cap is detachably installed at a top of the second shaft body and the third shaft bodies, and a bottom of the second shaft body is equipped with a second positioning column and second pins; the installation part further comprises a second installation part, and the second installation part comprises a second positioning slot and second hot plug sockets; the second positioning column is installed in the second positioning slot and the second pins are inserted into the second hot plug sockets to fix the second shaft body on the second installation part; the third shaft bodies are equipped with an opening, and the second keys further comprise a balance rod; both ends of the balance rod are equipped with an extension rod, and the extension rod is inserted into the opening, so that the balance rod rotates in conjunction with at least two third shaft bodies simultaneously.

10. The extended display screen of claim 9, wherein the second keys comprise at least one of an enter key, a space key, and an uppercase key.

11. The extended display screen of claim 7, wherein the key device further comprises an insulating rubber pad, the insulating rubber pad is provided above the base, and the insulating rubber pad is located between the PCB board and the base.

12. The extended display screen of claim 11, wherein a surface of the base is equipped with a third positioning column, the insulating rubber pad is equipped with a third positioning hole, and the PCB board is equipped with a fourth positioning hole; the third positioning hole and the fourth positioning hole are sequentially installed on the third positioning column, so that the insulating rubber pad and the PCB board are sequentially laid and fixed on the base.

13. The extended display screen of claim 7, wherein the key device further comprises a control motherboard, the control motherboard is electrically connected to the PCB board, the control motherboard is equipped with a video interface, and the video interface is electrically connected to the display body.

14. The extended display screen of claim 13, wherein a surface of the base is equipped with a fourth positioning column, the control motherboard is equipped with a fifth positioning hole, and the fifth positioning hole is installed on the fourth positioning column to enable the control motherboard to be installed on the base.

15. An extended display screen, comprising:
a display body;
a key device, wherein the key device is connected to the display body, and the key device is electrically connected to display body; and
a connector, wherein the display body comprises a first end, the key device comprises a second end, the connector comprises a third end and a fourth end, and the fourth end is opposite to the third end; the third end of the connector is rotatably connected to the first end of the display body, and the fourth end of the connector is connected to the second end of the key device;
wherein the display body comprises a wall and a baffle, the wall and the baffle are combined to form a display screen installation slot; the display body further comprises a display screen, and the display screen is installed in the display screen installation slot; the wall is connected to the connector.

16. The extended display screen of claim 13, further comprising a data interface and a power interface, and the data interface and the power interface are electrically connected to the control motherboard.

17. The extended display screen of claim 1, further comprising foot pads, and the foot pads are located at a bottom of the key device.

* * * * *